(12) United States Patent
Harlan

(10) Patent No.: US 6,778,973 B2
(45) Date of Patent: Aug. 17, 2004

(54) METHOD FOR SELECTION OF EVENTS BASED ON PROXIMITY

(76) Inventor: Duane Harlan, P.O. Box 255275, Sacramento, CA (US) 95865

( * ) Notice: Subject to any disclaimer, the term of this patent is extended or adjusted under 35 U.S.C. 154(b) by 185 days.

(21) Appl. No.: 09/759,812

(22) Filed: Jan. 11, 2001

(65) Prior Publication Data

US 2001/0054043 A1 Dec. 20, 2001

Related U.S. Application Data

(60) Provisional application No. 60/175,660, filed on Jan. 12, 2000.

(51) Int. Cl.[7] .............................................. G06F 17/30
(52) U.S. Cl. ................................ 707/1; 707/3; 707/10; 707/100; 707/103 R; 701/201; 705/6
(58) Field of Search ........................... 701/201, 1, 211, 701/213, 209, 202, 200, 207, 208, 210; 707/3, 100, 503, 104.1, 10, 102, 1, 5, 103 R; 709/217, 224, 203, 204, 219, 223, 225, 227, 238; 705/6, 10, 14, 26; 455/66, 67.1, 412, 414, 456

(56) References Cited

U.S. PATENT DOCUMENTS 6,202,023 B1 * 3/2001 Hancock et al. ............ 701/201
6,308,160 B1 * 10/2001 Rex ............................... 705/6
6,321,158 B1 * 11/2001 DeLorme et al. ........... 701/201

* cited by examiner

*Primary Examiner*—Shahid Alam
*Assistant Examiner*—Fred Ehichioya
(74) *Attorney, Agent, or Firm*—Stetina Brunda Garred & Brucker

(57) ABSTRACT

This invention provides a system for matching a user with an item in the nature of an activity, sporting or other event, or facility, referred to collectively as an ASEF, based on a request made by a user of the system. A database stores information related to the ASEF, such as the date, time and type of ASEF, along with the location of the ASEF. The database can represent the location of the ASEF in terms of latitude and longitude. The database can also include the latitude and longitude of each client user's position or have such user position location provided separately. When a client user interrogates the database, such as through a computer based server, with a request for information on a specific ASEF, the server not only supplies the available related ASEF information, but also calculates the distance from the client user's location to each of the ASEF's related to the user's request. If the client user requests that the activity lie within a given proximity, the server's program only outputs those activities within the user's requested proximity.

9 Claims, 4 Drawing Sheets

METHOD FOR SELECTION OF EVENTS BASED ON PROXIMITY

CROSS-REFERENCE TO RELATED APPLICATIONS

This application claims benefit under Title 35, United States Code §119(e) of U.S. Provisional Application No. 60/175,660 filed on Jan. 12, 2000.

FIELD OF THE INVENTION

This invention relates to gathering, processing and providing information from databases related to items such as sporting events, recreational activities, and availability of facilities, and in particular, to computer based interaction with individuals interested in such items within a desired physical proximity to the individuals.

BACKGROUND OF THE INVENTION

Persons who reside in a community often wish to learn of local activities, sporting events or other events, or facilities ("ASEF") that they could participate in (or use), either as an active participant or as a spectator. The ASEF is typically offered by individuals, entities, associations, or other organizations in the recreation, leisure, sports and fitness industries. Such persons could be individuals from a home, business, or other location, or providers of ASEF, such as city recreation staff personnel, or entities or organizations who are interested parties or providers of ASEF.

It is difficult for the average person to easily search and learn all activities, sporting events or other events, and facilities of interest within their desired proximity range. It is also difficult for the average person to determine (within the desired proximity of just their immediate community or a mileage range) the sport event result, such as standings in a softball league or the winner of a "fun run."

To learn this information, the person must presently search many diverse and different catalogs, lists, or other resources, and they must know in advance which lists to locate and then search. These catalogs may be available via written form or available on a global network such as the internet. The need to access multiple separate lists means that a person cannot easily determine, using a unified method, all of the local activities, events, classes, programs, facilities, or special events within a specified nearness or proximity to the persons home, business, or other location. The ability to identify and specify by proximity is necessary, as persons are typically interested only in events within a specified proximity, and are uninterested in events being held a long distance away.

In theory, a central list could be constructed by some centralized entity, however, it has historically been impossible to do so. The reason is that people typically wish to learn of appropriate activities, events, or facilities that are within a desired proximity to their home, business, or typical location, such as within a certain mileage range. There has been no common method that various entities could use so that a person could easily determine the proximity of their location to the location of the ASEF.

Another barrier to solving this problem is that various organizations are located in different locations throughout a community, they maintain and keep their own lists of ASEF, and they have not historically had any method to identify their ASEF entries with a location identifier that is a standardized method that could be used by many entities, organizations, or persons. A person does not intuitively "know" the proximity or distance from their location to every other organization and places where ASEF are located.

For example, the list of activities, events, or facilities that are managed or offered by the "Futureville city recreation department" typically has had no connection to the list managed by the "Futureville private health club" in a community, or a private fitness or sports coordinator who might offer "fun runs," races, or other sporting or athletic events somewhere either in "Futureville" or within a desired mileage range.

A missing piece has been a method for all entities to identify the location of their ASEF in a common method which can then be searched, retrieved, and limited by a proximity basis (such as within XX miles) by persons.

Software products such as the Yahoo internet search engine, available on the internet at http://www.yahoo.com (and other internet search engines), have not included a common method for specifying the precise location of where the ASEF are held and also not provided any ability for the person or user to be able to determine distance/proximity. There has also not been any provision made for the user to specify their desired distance or proximity, except for very crude techniques such as also entering a city name or other identifier, which cannot determine proximity with any degree of accuracy or reliability.

Software products such as MapQuest, available on the internet at http://www.mapquest.com (and other mapping programs), do not have any provision to either calculate distance based on proximity from the person, or to conduct a "general and non-specific search" for a large comprehensive list of all ASEF within a specified proximity or mileage range.

Software products developed specifically for the recreation and park industry such as RecWare PRO, provided by Active.com of La Jolla, Calif., Class, provided by Escom Software Ltd. of Burnaby, British Columbia, RecTrac, provided by Vermont Systems of Essex Junction, Vt., ParcSoft, provided by HTE of Lake Mary, Fla., and AEK, provided by Klawitter Assoc. of Chicago, Ill., have previously only included the ability to identify "fixed locations" for activities, events, or facilities, such as the name of a community center or a physical street address (or equivalent). This has prevented any ability to do a "proximity search" within a specified range. An additional limiting factor is that many of these products have historically been designed only for "desktop PC" usage, and the data or ASEF that they track or manage has not been commonly available via a global network such as the internet. This has prevented persons using the internet to be able to locate information on ASEF, let alone determine all ASEF of interest within a specified proximity or mileage radius.

Software products developed specifically to handle ASEF for municipal, university, or private health or fitness clubs such as Karch, provided by Karch International of McLean, Va., CheckFree, provided by Checkfree of Norcross, Ga., CSI, provided by CSI Software of Houston, Tex., and Aphelion, provided by Aphelion Software of Houston, Tex., have previously only included the ability to identify "fixed locations" for activities, events, or facilities, such as the name of a fitness center or a physical street address (or equivalent). This has prevented any ability to do a "proximity search" within a specified range. An additional limiting factor is that many of these products have historically been designed only for "desktop PC" usage, and the data or ASEF that they track or manage has not been commonly available via a global network such as the internet. This has prevented persons using the internet from being able to locate information on ASEF, let alone determine all ASEF of interest within a specified proximity or mileage radius.

While the methods known in the art provide much useful information to public users of the services, they do not completely meet the needs of these users. Specifically, a need exists for a service which identifies ASEF of interest to a user within a desired proximity relative to a user.

SUMMARY OF THE INVENTION

In addition to the information presently available by prior art systems relating to services, activities, schedules and locations of recreational, sporting and similar activities, and other ASEF, this invention contemplates storing the latitude and longitude of the location of each such item in a server's database. When a client user, also called a requester, interrogates the server with a query/request for information on a specific item, the user can also indicate the user's location. The server then not only supplies the presently available servicing information, but also calculates the distance from the client user's location to each of the items specific to the user's request. This computation utilizes a conventional navigational program that accepts as input the latitudes and longitudes of two separate locations, and calculates the distance between the locations. If the client user requests that the item lie within a given proximity distance from his location, the server's program only outputs those items within the user's requested proximity.

In a first embodiment of this invention, the server computer already has stored the location information for the user, based on prior information provided by the user. In a second embodiment, the client user's latitude/longitude database is not maintained at the server, but each client user has his own latitude and longitude data stored in his desk top computer, input terminal or other appliance provided along with a query. The client user's computer can also include the program for computing distances, and uses longitude/latitude data downloaded from the server for the requested items to compute the distances. Alternatively, the user can send position information to the server computer and the server computer can run the program to compute distances from the user to the items. The user's also has the capability of limiting the displayed results to those items within the user's specified proximity.

The data for latitude and longitude for both the server's providers and items, and the client users' locations may be determined by reading the coordinates from geographic charts, such as the U.S. coast, national geographical survey and Geodetic charts, or determining the coordinates directly at a given location by use of a global positioning system "GPS," receiver.

OBJECTS OF THE INVENTION

Accordingly, a primary object of the present invention is to provide a system which includes information about local activities, sporting events or other events, or facilities ("ASEF") including detailed information about the ASEF item and the precise location of the ASEF item. A user can request a particular ASEF item and specify a location in terms of a proximity from a location at which the user is located. The system thus provides to the user items matching the user's criteria and which are within the desired proximity from the user.

Another object of the present invention is to provide an ASEF item locating system which allows a user to identify items within a desired proximity range from the user.

Another object of the present invention is to provide an ASEF item locator system which is accessible over a global network of computers such as the internet.

Another object of the present invention is to provide an ASEF item locator service which includes information about items provided by a variety of different entities with location information about each of the items so that a proximity of the items from the user can be determined.

Another object of the present invention is to provide an ASEF item locator system which has information stored therein relating to a location of a group of users so that the users can automatically have items within a desired proximity provided by the system.

Other further objects of the present invention will become apparent from a careful reading of the included drawing figures, the claims and detailed description of the invention.

DESCRIPTION OF THE PREFERRED EMBODIMENT

Figure 1:
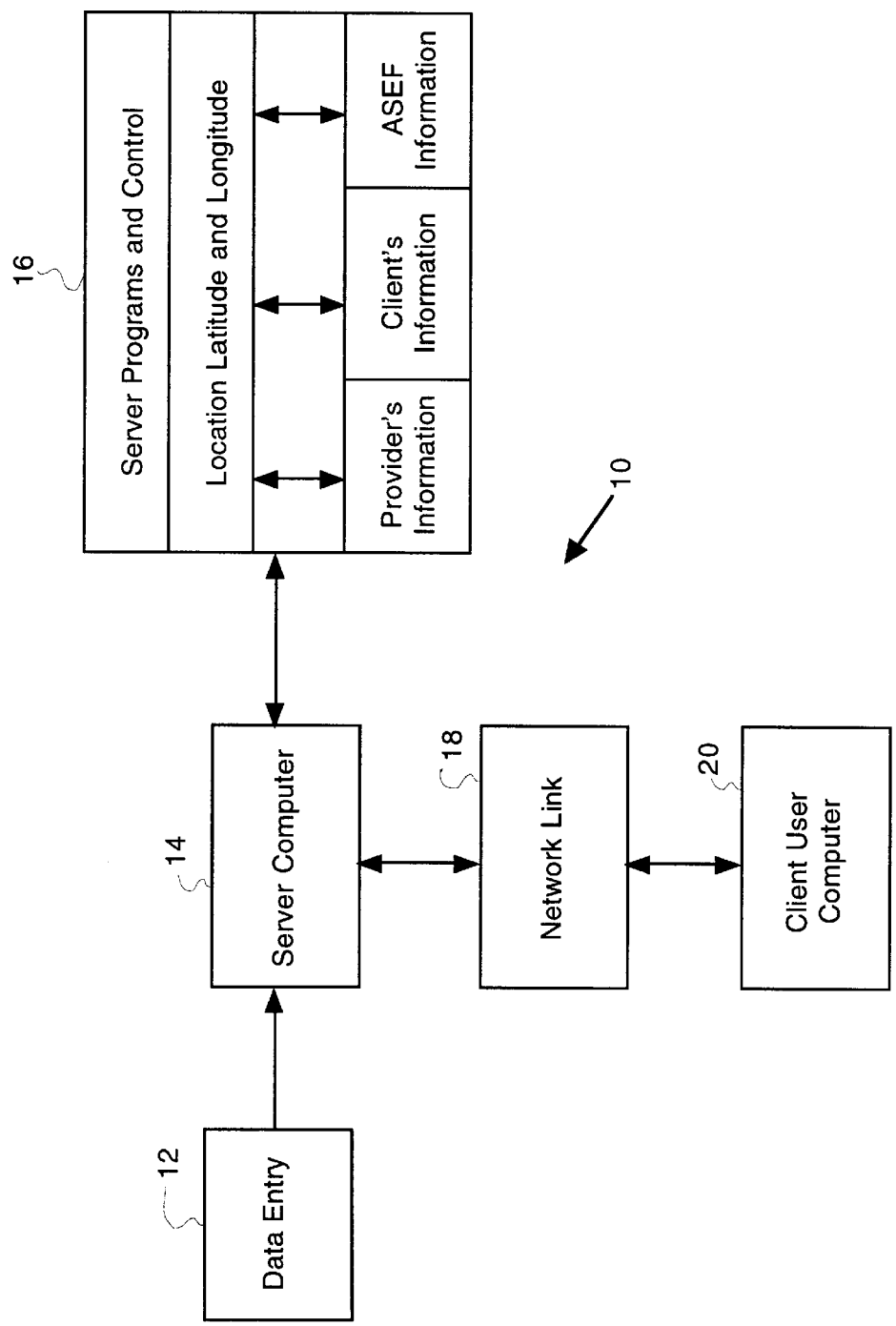
FIG. 1 is a block diagram of the system of the invention.

Referring to FIG. 1, the system of the invention 10 utilizes a data entry 12 which inputs information about a provider's activities, sporting or other events, or facilities, referred to collectively as "ASEF," to the system's server computer 14. The data entry 12 may be implemented from a keyboard, disc reader, tape reader or other techniques known in the art for entering digital data into a computing system. The server computer 14 can be controlled by the provider or by a third party.

The database 16 of the server computer 14 stores the provider's ASEF item information provided through the data entry 12, and includes related information (also called descriptive characteristics) including times, dates, availabilities, charges, descriptions or other cogent information related to the provider's ASEF items. In accordance with the present invention, the latitudes and longitudes of the ASEF are also entered into and stored within the database 16.

Additionally, the client users' identities are optionally stored in the database 16. For instance, frequent users can register and have their position provided as part of that registration file in the database 16. The user's latitude and longitude may be stored either on the server 14 or the client user computer 20. These positions can include the latitudes and longitudes of the user's locations. Server programs for function and control of the system are also stored in the server computer 14 or media accessed by the server computer 14, having been input to the computer by means known in the art.

In a most basic form of the invention, the server computer 14 could be isolated from other computers/networks. The server computer 14 could be accessed by a single person or group of authorized operators to give information to requester client users who call on the operators by telephone, mail or walk-up location. However, the system 10 preferably is accessed by requestor users over a computer network.

The server computer 14 feeds a network link 18, allowing the receipt of a client user request and the transfer of the server's computed output information to the client user's computer 20. The client user is also referred to as a "requester." The network link 18 may be compatible with the internet, an intranet network or other interactive data exchange means. The client user's computer 20 is conventionally a desktop computer or other data terminal or appliance with software for interactive bidirectional communication.

Figure 2:
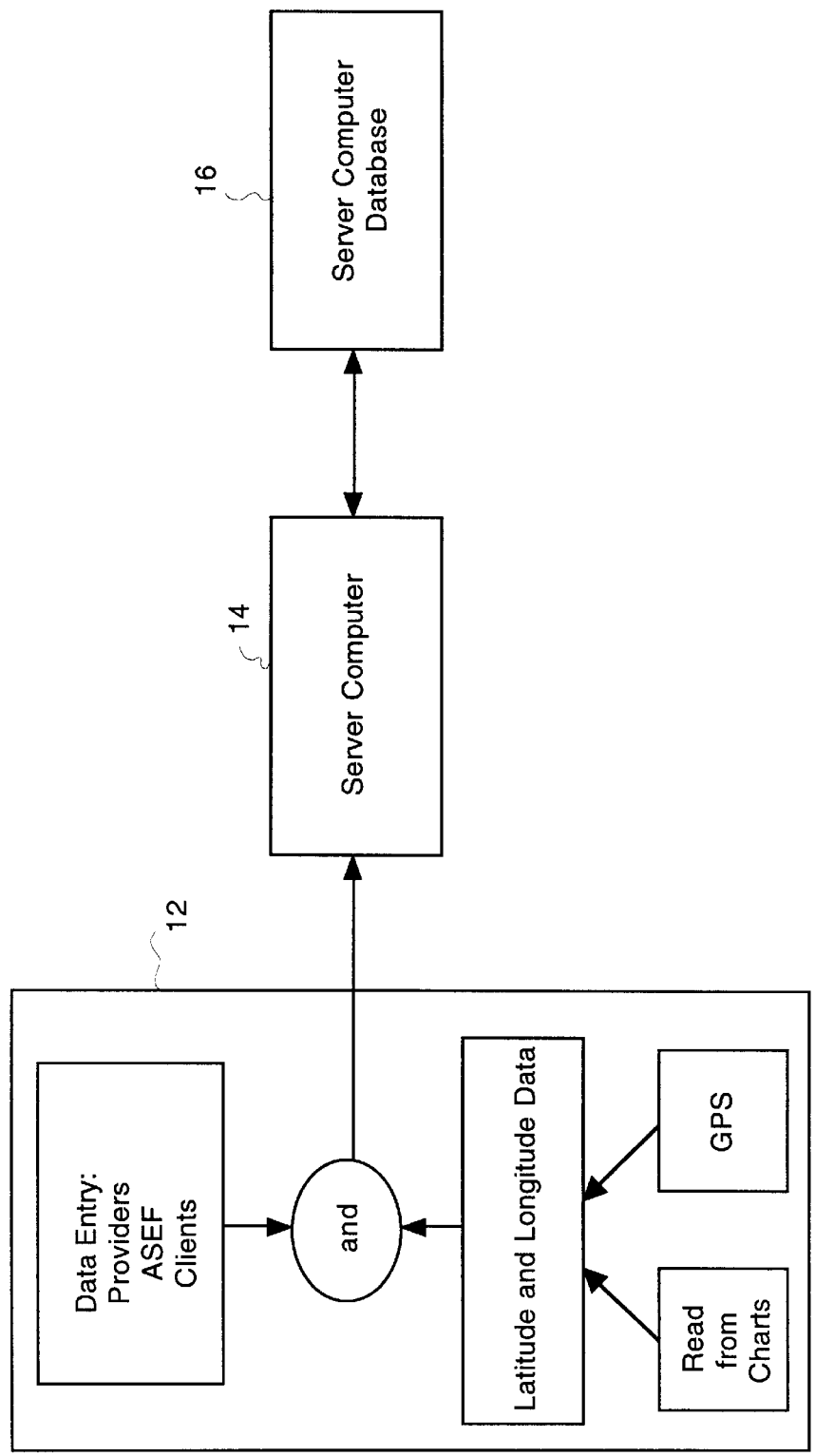
FIG. 2 is a block diagram illustrating entry of data into the system of the invention.

Referring to FIG. 2, data entry 12 includes the entry of data related to ASEF items by use of a keyboard, disk, tape or other means known in the art. In accordance with the present invention, data related to the latitudes and longitudes of the locations of the ASEF items are input for the respective items, or derived from a map, table or data file, so that each ASEF item will have its correct latitude and longitude linked to it. Optionally, the client users can be preregistered with their position information (i.e. address) included in the database 16 by data entry 12. The address information can be correlated to latitude and longitude data or directly entered by personnel, such as by reference to a map. The latitude and longitude data for ASEF and/or users may be obtained from appropriate charts or from a global positioning system ("GPS") receiver, and is input to the system by keyboard or other input devices. The server computer 14 merges the locations and latitudes and longitudes, and the resultant information is stored in the server computer database 16. While this means to determine the requestor user's position is preferred, other techniques could be used. For instance, the user's query of the server database could include the user's position, either in the form of a street address or latitude and longitude, or other position identification.

Figure 3:
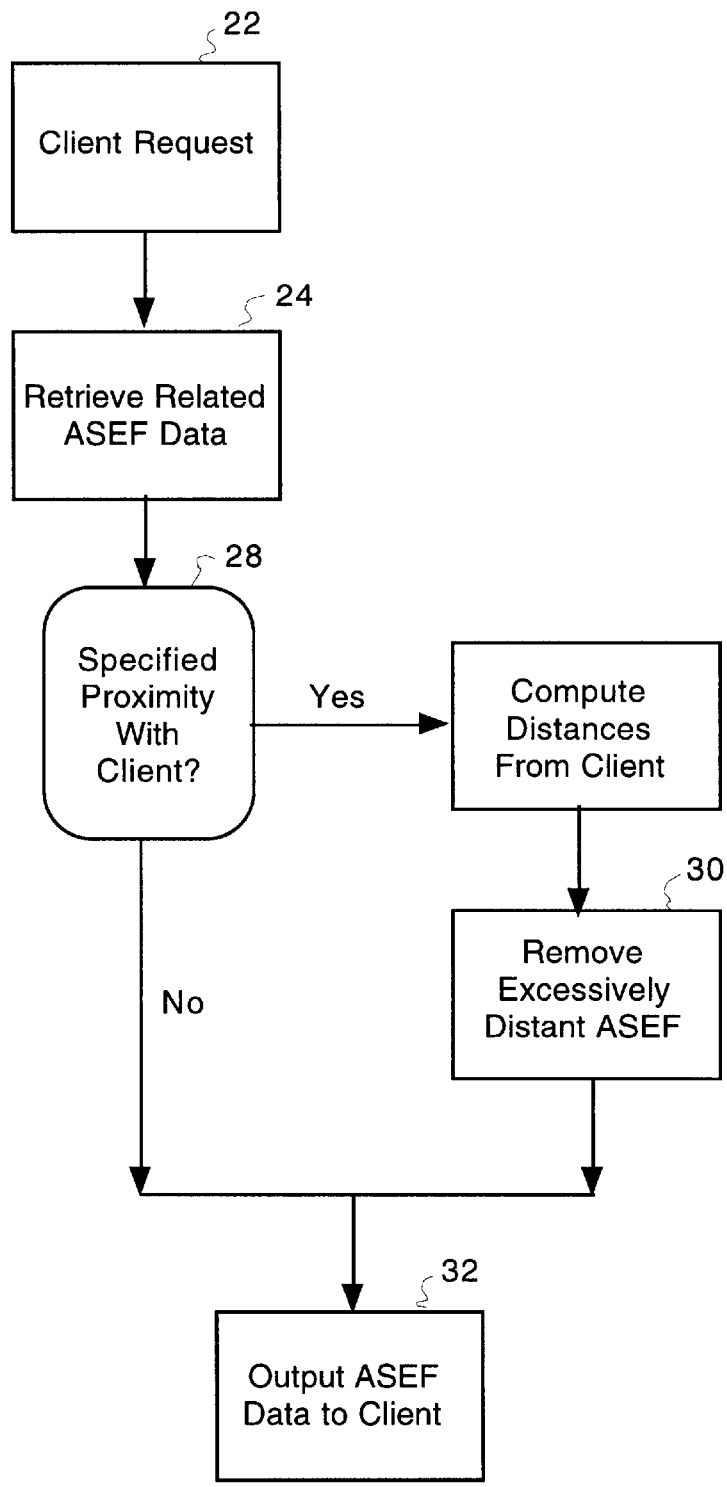
FIG. 3 is a flow chart showing operation of the invention.
Figure 4:
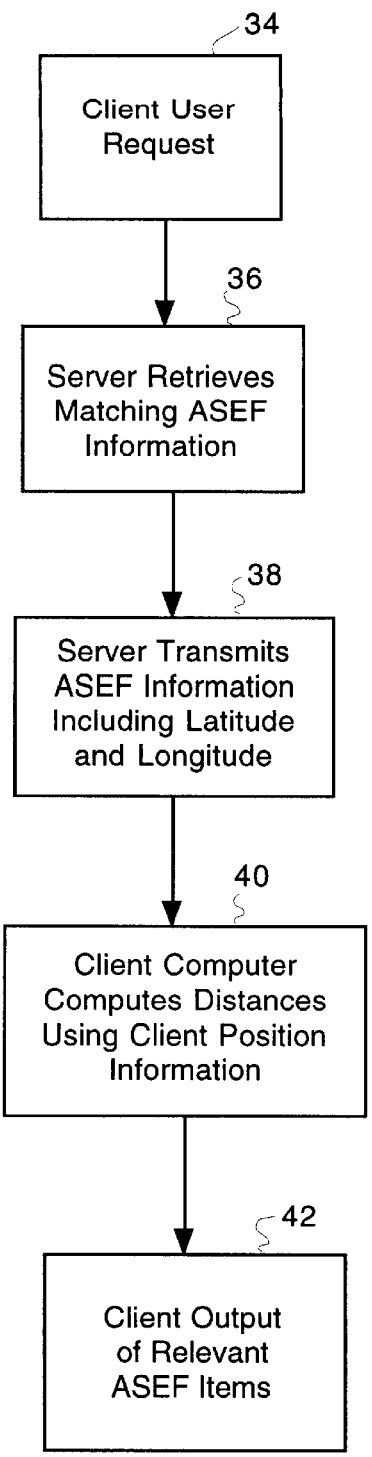
FIG. 4 is a flow chart illustrating the operation of the second embodiment of the invention.

FIG. 3 illustrates the process by which a client user/requestor requests information from the server computer 14 (FIGS. 1 and 2). Initially, the requester makes a request including the specific providers and/or ASEF items in which the requester has interest. The requester can also specify a desired proximity of the ASEF items from the requester or the system 10 can have an automatic default maximum distance as the proximity. The server computer 14 retrieves the information 24 related to the client user's request, including the locations of the items and their latitudes and longitudes. The server computer also calls up the latitude and longitude of the client user making the request from the database 16 (FIGS. 1 and 2) or the request itself.

The server computer 14 computes the distance from the client user to each of the ASEF items with which the requestor's query has matched. This computation utilizes the latitude and longitude data for the requested items, and for the client's location, and is performed using a conventional navigational computer program for calculating distance from the latitudes and longitudes of two geographical points. Specifically, the distance is computed 26 as follows. First, a latitude difference is calculated equal to a difference between the latitude of the ASEF item and the latitude of the requestor. Second, a longitude difference is calculated by determining a difference between a longitude position of the ASEF item and a longitude position of the requestor. Third, the distance is calculated by taking the square root of the sum of the square of the longitude difference and the square of the latitude difference, in essence by utilizing trigonometry. Other techniques could also be utilized with the latitude and longitude information for the ASEF items and the requestor's position.

If the client user's request specified items within a given distance of the client user's position, the computer filters out excessively distant ASEF item data 30 and outputs it 32 to the client. If a distance is not specified, the computer outputs 30 the total number of ASEF items meeting the clients request, regardless of distance from the requestor's location or uses a default maximum distance or a maximum umber of entries.

In a second embodiment, the flow of information between a server and a client user is illustrated. The client user's request 34 is transmitted to the server computer 14 (FIG. 1) which retrieves matching data 36 related to the ASEF items for which the client user requires information. The server sends 38 the requested information, including the latitudes and longitudes of the locations of the ASEF items requested, to the client user. Note that the client user's latitude is not stored in the server's computer 14. In the second embodiment, the client's latitude and longitude values reside in the client's computer, and the client's computer has the navigational computation program stored in its memory or run off of a network directly. The client, therefore, uses this program in conjunction with the latitude and longitude information downloaded from the server related to the ASEF items to compute the client's distance from the ASEF items of interest. With the distance information in hand, the client can then select those items within a specified distance from the client's location.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for identifying availability of a desired item within a desired proximity of the residence of a user, the method including the steps of:

entering data for a plurality of items to a searchable database, said items taken from a group of items selected from the group consisting of participatory sporting events, non-participatory sporting events, non-sporting events and facilities available for said user to participate in or attend, said data entered by a provider of said items;

entering at least two descriptive characteristics into the database associated with each item in the database, at least one item being descriptive of the dates and time of day said items are available for reservation, said characteristics entered by the provider of said item;

entering a location of each item into the database, said location entered by the provider of said item;

receiving a query from a user about availability of items that have at least two characteristics matching at least two characteristics specified in the query, at least one characteristic being said description of the dates and time of day said item is available for reservation;

identifying the residence of the user;

determining a desired proximity range relative said residence;

calculating a distance from the residence of the user to the items that have at least two characteristics matching said characteristics specified in the query, at least one characteristic being said description of the dates and time of day said item is available for said user to participate in or attend; and outputting to the user at least one item matching said characteristics specified in the query and located within the desired proximity relative said residence.

2. The method of claim 1 wherein at least one descriptive characteristic includes at least one characteristic taken from a group of characteristics including time of item availability, date of item availability, type of item and cost associated with each respective item.

3. The method of claim 2 wherein each said item within said database includes each of the descriptive characteristics included in the group of descriptive characteristics provided within the database for each of the items contained within the database.

4. The method of claim 1 wherein said entering a location step and said determining a position step includes identifying a latitude and a longitude of the location of each item and a latitude and a longitude of the residence of the user, such that distance calculations can be made based on the latitudes and longitudes of the items and the user.

5. The method of claim 4 wherein said calculating step includes the steps of determining a difference in the latitude of at least one of the items and a latitude of the residence of the user and a difference between a longitude of at least one of the items and a longitude of the residence of the user; and deriving the distance between the location of at least one of the items and the position of the residence of the user by taking the square root of the sum of the square of the difference between the latitudes of at least one of the items and the user and the square of the difference between the longitude of at least one of the items and the residence of the user.

6. The method of claim 1 wherein said determining a position of the residence of the user step includes the steps of entering information within the database about the user including the user's residential street address; and calling up the user's position information when the user is identified.

7. The method of claim 1 wherein said determining a desired proximity range step includes the step of allowing the user to select the proximity range and include this proximity range within the query and said receiving step.

8. The method of claim 1 wherein said determining a desired proximity range step is pre-selected as a fixed distance within the database.

9. The method of claim 1 including the further step of sorting the items of said output step such that closest items appear first and more distant items appear later.

* * * * *